United States Patent [19]

Rohde et al.

[11] Patent Number: 4,671,333
[45] Date of Patent: Jun. 9, 1987

[54] PNEUMATIC VEHICLE TIRE

[75] Inventors: Dieter Rohde, Lehrte; Siegfried Praetorius, Barsinghausen, both of Fed. Rep. of Germany

[73] Assignee: Continental Gummi-Werke Aktiengesellschaft, Hanover, Fed. Rep. of Germany

[21] Appl. No.: 766,027

[22] Filed: Aug. 15, 1985

[30] Foreign Application Priority Data

Aug. 15, 1984 [DE] Fed. Rep. of Germany ....... 3430501

[51] Int. Cl.⁴ .................... B60C 9/18; B60C 11/01
[52] U.S. Cl. .................... 152/532; 152/209 R; 152/538
[58] Field of Search ........... 152/454, 532, 535, 537, 152/538, 549, 526, 209 NT, 209 R

[56] References Cited

U.S. PATENT DOCUMENTS

| Re. 26,464 | 9/1968 | Lugli | 152/176 |
|---|---|---|---|
| 2,108,973 | 2/1938 | Parkinson | 152/532 |
| 3,481,385 | 12/1969 | Depmeyer et al. | 152/532 |
| 3,976,115 | 8/1976 | Mirtain et al. | 152/538 X |
| 4,062,393 | 12/1977 | Bertrand | 152/532 |
| 4,079,768 | 3/1978 | Verdier | 152/538 X |
| 4,262,726 | 4/1981 | Welter | 152/532 X |
| 4,349,061 | 9/1982 | Hirakawa et al. | 152/532 X |
| 4,425,953 | 1/1984 | Rohde et al. | 152/532 |

FOREIGN PATENT DOCUMENTS

| 2813597 | 10/1979 | Fed. Rep. of Germany | 152/538 |
|---|---|---|---|
| 3329837 | 2/1985 | Fed. Rep. of Germany | 152/450 |
| 1558415 | 1/1969 | France | 152/538 |
| 2303675 | 3/1971 | France | 152/538 |

Primary Examiner—Donald Czaja
Assistant Examiner—Ramon R. Hoch
Attorney, Agent, or Firm—Becker & Becker, Inc.

[57] ABSTRACT

A belted tire having a respective step at each of the edges of the tread strip, with the edges of the belt extending to below the approximately horizontal surface of the step. In order to avoid undesirable heat formation, and hence to reduce the rolling resistance, a low-dampening rubber layer is disposed between two belt piles, with the rubber layer ending prior to the edges of the belt. In these regions, as extensions of the intermediate layer, respective additional rubber strips are provided. Half of the width of a given rubber strip is disposed below the belt plies, and the other half of the width of that strip extends laterally beyond the belt. These rubber strips are harder than the low-damping intermediate layer.

2 Claims, 2 Drawing Figures

PNEUMATIC VEHICLE TIRE

BACKGROUND OF THE INVENTION

1. Field of the Invention

The present invention relates to a pneumatic vehicle tire having a radial carcass, a tread strip, and a pull-resistant belt disposed between the carcass and the tread strip; disposed on each side of the tread strip is a respective shoulder-like extension which is formed by a step and does not come into contact with the roadway under normal driving conditions; each step extension has a substantially radially extending surface adjacent the tread strip, and a base which is substantially parallel to the tread surface of the tread strip and is disposed radially inwardly of the tread surface; the edges of the belt extend to within the vicinity of the step extension, extending laterally beyond the radially extending surface by an amount equal to approximately 25–40% of the amount by which the bulged sidewalls of the tire extend beyond the radially extending surface of the step extension at the widest location of the sidewalls

2. Description of the Prior Art

Pneumatic vehicle tires of this general type provide a favorable reinforcement of the tread strip zone, which leads to a favorable wear pattern of the tread strip. At the same time, as a result of the shoulder step, in conjunction with the relatively wide belt, a vibrational uncoupling of the tread strip portion of the tire relative to the sidewall portion of the tire is promoted.

An object of the present invention is to improve the aforementioned general type of tire in such a way that unavoidable deformations of the tread strip zone do not lead to undesired heat formation, so that the rolling resistance of the tire can also be reduced.

BRIEF DESCRIPTION OF THE DRAWING

This object, and other objects and advantages of the present invention, will appear more clearly from the following specification in conjunction with the accompanying drawing, in which.

SUMMARY OF THE INVENTION

Figure 1:
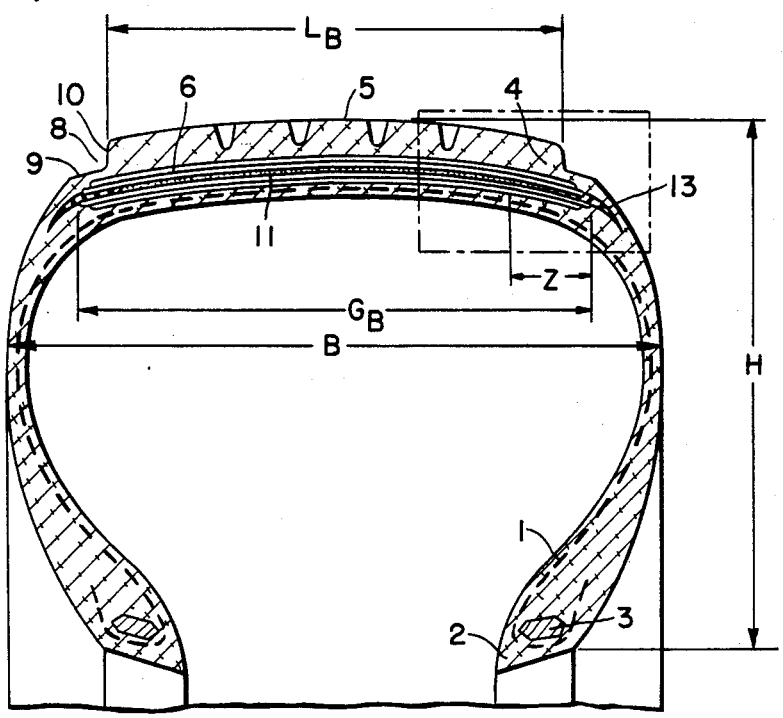
FIG. 1 is a view showing a partial radial section through one embodiment of the inventive pneumatic vehicle tire.
Figure 2:
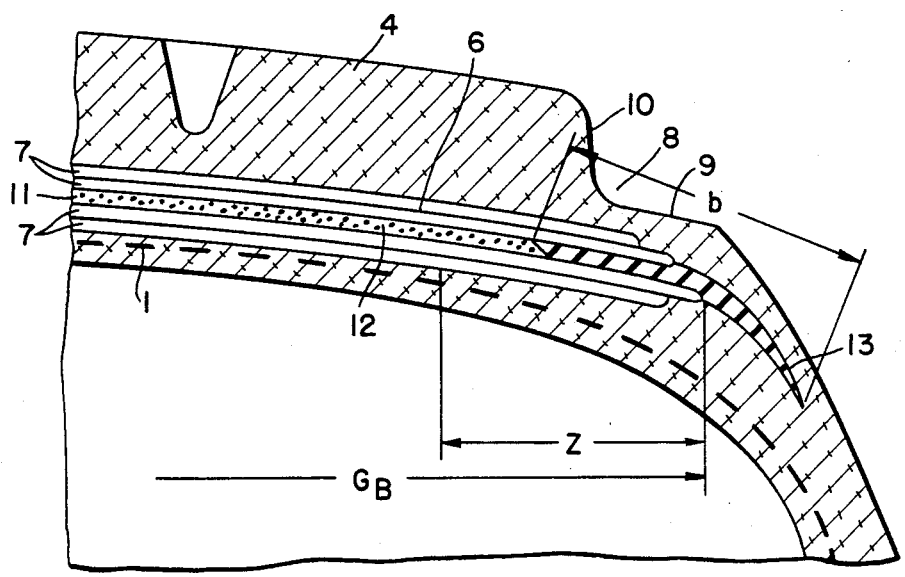
FIG. 2 is a view showing an enlarged radial section of that shoulder portion of the tire which is within the dot-dash line portion of FIG. 1.

The tire of the present invention is characterized primarily in that a low-damping rubber layer is disposed between at least two of the plies of the belt; the rubber layer has a thickness corresponding at least approximately to the diameter of the loadcarriers of the belt, though not exceeding a thickness of 5 mm; the rubber layer extends toward both sides of the tire, practically to the planes defined by the vertically or radially extending surfaces of the step; a respective strip is connected to each edge of the softer rubber layer, in the region of the two belt edges, as an extension of the rubber layer; half the width of a given strip is disposed between the belt plies, while the other half of the width of that strip extends further into the step extension, and extends laterally beyond the approximately horizontal base of the step.

The important thing to note is that a low-damping intermediate layer which extends over the entire width of the belt is not the best solution, because such a low-damping intermediate layer is not in a position to sufficiently take care of the stress or load which results in the region of the edges of the belt. For this reason, in addition to the aforementioned low-damping rubber layer in the region of the edges of the belt, the present invention also provides strips as continuations of the edges of the low-damping intermediate layer. These additional rubber strips, which are provided in the vicinity of the edges of the belt, can best increase the fatigue strength in the region of the edges of the belt if half of the width of the strips is disposed between the belt plies, with the remaining portion of the width of the strips extending into the shoulder region of the tire below the step. Surprisingly, it has been proven that the inventive edge strips, which can be comparatively harder than the adjacent low-damping layer, do not appreciably affect the aforementioned insulation effect, i.e. the effect of the low-damping or absorbing intermediate layer. With a good insulating effect, an excellent fatigue strength is achieved in the edge regions of the belt.

DESCRIPTION OF PREFERRED EMBODIMENTS

Referring now to the drawing in detail, the tire body is essentially comprised of rubber or rubberlike material. The tire body is strengthened by reinforcing elements which are rigidly connected with the rubber or other material by vulcanization. The edges of the radial carcass 1 are anchored in the tire beads 2 by being looped around the bead cores 3. The tread strip 4 is limited toward the outside by the tread surface 5. Disposed between the tread strip 4 and the radial carcass 1 is a belt 6 which is pull-resistant in the circumferential direction, and which comprises four cord plies 7 which are disposed one above the other. The load-carriers of a given one of the plies 7 extend parallel to one another, with the load-carriers of a given ply extending at an angle to the load-carriers of the adjacent ply and at an angle to the circumferential direction of the tire.

Preferably, the two upper pairs of plies 7 on the one hand, and the two lower pairs of plies 7 on the other hand, form symmetrical cross-banding arrangements.

The width of the tire is designated with the reference symbol B, and the height of the tire is indicated with the reference symbol H. With the illustrated truck tire, the ratio of H to B is less than 85%.

For the inventive tire, it is important to have a step or shoulder 8 at both edges of the tread strip 4. The shoulder 8 has an essentially cylindrical base 9 which extends approximately parallel to the tread surface 5; the shoulder 8 also has an approximately vertical shoulder surface 10 which determines the effective width $L_B$ of the tread striP 4.

The dimensioning of the shoulder 8 is such that while taking into consideration the profiling of the tread strip 4, the base 9 does not come into contact with the roadway under normal driving conditions.

The belt width $G_B$, and the greatest width of the tire body as measured at approximately half of the height of the tire cross-section, should have a certain relationship relative to one another and relative to the tread strip width $L_B$.

The width B is such that $$\frac{G_B - L_B}{B - L_B} = 0.25 \text{ to } 0.4$$

preferably having a value of 0.3. This means that the zone Z, in which the edge of the belt extends at an angle to the carcass 1, is relatively small, and is preferably only about twice the amount by which the edge of the belt extends beyond the vertical shoulder surface 10. In this way an appropriately lesser amount of support rubber in the form of the customary rubber supporting strip suffices. Moreover, a relatively great bulging results due to the width B of the tire.

The previously described construction of the shoulder, in conjunction with the aforementioned shape of the shoulder, leads to a considerable reduction of the rolling resistance when the subsequently to be described features are provided.

A rubber layer 11 is provided between the upper pair of plies 7 on the one hand and the bottom pair of plies 7 of the belt 6 on the other hand. The rubber layer 11 is formed by a central strip 12, and two side strips 13. The width "b" of the strips 13 is approximately 1/6 of the dimension $G_B$. Furthermore, the strips 13 are inserted in the belt 6 in such a way that half of the width of a given strip 13 is disposed between the cord plies 7, with the remaining portion of the width of that strip 13 extending beyond the belt 6, i.e. into the shoulder zone of the belt closely below the surface 9 of the step or shoulder 8. In so doing, the edge section of the strip 13 which projects beyond the belt 6 has an orientation which essentially corresponds to the orientation of the carcass in the shoulder region.

The layer or strip 12 has a Shore A hardness of between 40 and 50, preferably, however, 48 Shore. In contrast, the hardness of the strips 13 is 58 to 80, and is preferably approximately 65 to 70 Shore A. Moreover, the rubber layers located in the shoulder region of the tire and surrounding the strips 13 have a hardness which is approximately 5 to 15 Shore A less than the hardness of the strips 13. The tread strip 4 preferably has a hardness of 60 to 65 Shore A.

Measured pursuant to DIN (German Industrial Norm) 53512, the layer 12 should have a rebound elasticity of 60 to 70%, the strips 13 should have a rebound elasticity of 40 to 50%, and the tread strip 4 should have a rebound elasticity of 40%. The rubber layers which enclose the outer edges of the strips therefore have a rebound elasticity which is approximately 10 to 30% less than that of the strips 12.

The present invention is, of course, in no way restricted to the specific disclosure of the specification and drawing, but also encompasses any modifications within the scope of the appended claims.

What we claim is:

1. A pneumatic vehicle tire having a radial carcass, a tread strip, and a pull-resistant belt which is disposed between said carcass and said tread strip and comprises a plurality of plies having load-carriers; provided on each side of said tread strip is a respective shoulder-like extension which is formed by a step and does not come into contact with the roadway under normal driving conditions; each step extension has a substantially radially extending surface adjacent to said tread strip, and a base which is substantially parallel to the tread surface of said tread strip and is disposed radially further inwardly than is said tread surface; the edges of said belt extend to within the vicinity of said step extension, and extend laterally beyond said radially extending surfaces thereof by an amount equal to approximately 25-40% of the amount by which the bulged sidewalls of said tire extend beyond said radially extending surfaces at the widest location of said sidewalls; the improvement therewith which comprises:

a low-damping rubber layer disposed between at least two of said plies of said belt, said rubber layer having a thickness corresponding at least approximately to the diameter of said load-carriers of said belt plies, though not exceeding a thickness of 5 mm; said rubber layer extends toward both sides of said tire, practically to the planes defined by said radially extending surfaces of said step extension; and a respective strip connected to each edge of said rubber layer, in the region of the two edges of said belt, as an extension of said rubber layer; half the width of a given one of said strips is disposed between the same two aformentioned plies of said belt, and extends to radially inwardly of said base of said step extension; the other half of the width of said given one of said strips extends laterally beyond said base of said step extension; those portions of said strips, which extend laterally beyond said belt, extending radially inwardly and approximately parallel to said radial carcass; said strips having a Shore A hardness of approximately 58 to 80, and said rubber layer having a Shore A hardness of approximately 40 to 50; said strips having a rebound elasticity of 40 to 50%, and said rubber layer having a rebound elasticity of 60 to 70%; said tire having shoulder regions with rubber layers which surround said strips and are significantly softer than the latter, with this difference in Shore A hardness being approximately 5 to 15.

2. A tire according to claim 1, in which each of said strips has a width corresponding to essentially 1/6 of the width of said belt.

* * * * *

UNITED STATES PATENT AND TRADEMARK OFFICE
CERTIFICATE OF CORRECTION

PATENT NO. : 4671333
DATED      : 9 June 1987
INVENTOR(S): DIETER ROHDE ET AL

It is certified that error appears in the above-identified patent and that said Letters Patent is hereby corrected as shown below:

On the cover sheet, please correct the patent to read:

[30]     Foreign Application Priority Date
  Aug. 18, 1984 [DE]  Fed.Rep. of Germany....3430501

Signed and Sealed this

Twenty-second Day of September, 1987

Attest:

DONALD J. QUIGG

Attesting Officer     Commissioner of Patents and Trademarks